(12) United States Patent
Thompson

(10) Patent No.: US 6,619,470 B2
(45) Date of Patent: Sep. 16, 2003

(54) METHOD AND SYSTEM FOR VIBRATORY CONVEYOR CONTROL

(75) Inventor: Brian Thompson, Tigard, OR (US)

(73) Assignee: FMC Technologies, Inc., Chicago, IL (US)

( * ) Notice: Subject to any disclaimer, the term of this patent is extended or adjusted under 35 U.S.C. 154(b) by 21 days.

(21) Appl. No.: 10/053,233

(22) Filed: Jan. 17, 2002

(65) Prior Publication Data

US 2003/0132086 A1 Jul. 17, 2003

(51) Int. Cl.⁷ .............................................. B65G 27/32
(52) U.S. Cl. ...................................... 198/762; 198/761
(58) Field of Search ............................... 198/761, 762, 198/758, 759, 766

(56) References Cited

U.S. PATENT DOCUMENTS

| | | | | |
|---|---|---|---|---|
| 5,080,218 A | * | 1/1992 | Izume et al. ............. | 198/762 X |
| 5,883,478 A | | 3/1999 | Thesling | |
| 6,079,549 A | * | 6/2000 | Meitinger ................ | 198/762 X |
| 6,168,010 B1 | * | 1/2001 | Komatsu ................. | 198/761 X |
| 6,308,822 B1 | * | 10/2001 | Moran et al. ................ | 198/762 |

OTHER PUBLICATIONS

*Magnotron Vibratory Conveyors Operations and Maintenance Manual*, Allen Systems FMC FoodTech, Newberg, Oregon, revised May 19, 1999, electrical schematics pp. 27–30.

* cited by examiner

Primary Examiner—James R. Bidwell
(74) Attorney, Agent, or Firm—Christensen O'Connor Johnson Kindness PLLC

(57) ABSTRACT

The present invention contemplates a system for controlling a vibratory conveyor on which a conveyor pan is mounted, the system including a drive coil for driving the vibratory conveyor with a vibrating motion; a sensing subsystem for detecting the vibrating motion of the conveyor pan; a controller coupled to the sensing subsystem for generating at least one control signal to be applied to the drive coil, the controller generating at least one control signal by producing a digitized signal from the detected vibrating motion and computing three intermediate timing positions in each period of the digitized signal; and a switching subsystem for applying at least one control signal generated by the controller to the drive coil. At least one control signal is applied between the first and third intermediate timing positions in each period of the digitized signal to control the vibration amplitude and vibration frequency of the vibratory conveyor.

34 Claims, 10 Drawing Sheets

METHOD AND SYSTEM FOR VIBRATORY CONVEYOR CONTROL

FIELD OF THE INVENTION

This invention is directed to a control technique for vibratory conveyors and, more particularly, to a method and system for controlling a vibratory conveyor using pulse width modulated drive signals, vibratory amplitudes and resonant frequency control.

BACKGROUND OF THE INVENTION

Vibratory conveyors are used industrially for moving products of different shapes and weights from one location to another. For example, in the packaging of fragile food products such as potato chips or cookies, the food product is received from a central location, such as a cooking oven, and conveyed to a plurality of work stations having packaging machines. The processing of produce (e.g., fruits and vegetables) similarly requires the handling of fragile food products. Vibratory conveyors are especially useful in such applications because such fragile food products may not readily be transported in other ways without damaging the products.

Despite the usefulness of vibratory conveyors in these types of applications, some existing systems still lack effective methods for controlling vibration amplitude and frequency. In open loop control systems, for example, vibration intensity is often controlled simply by using a variable transformer or some other means for manually regulating a voltage source. However, such systems tend to be sensitive to line voltage variations, load changes, spring wear and other dynamic conditions that result in inconsistent control of the vibration envelope.

In closed loop configurations, vibratory conveyors tend to be driven at their resonant frequency and employ sensors for acquiring vibration amplitude feedback. However, closed loop configurations of vibratory conveyors tend to require controllers that are expensive and complex to implement. In particular, closed loop systems tend to use expensive and complicated linear drive circuits and control techniques that consume excessive power. Frequently, such linear drive circuits are based on MOSFET (Metal Oxide Semiconductor Field Effect Transistor) circuit technology, which can result in costly implementations of closed loop vibratory conveyor control systems.

Vibration frequency in certain existing closed loop control systems is controlled by applying an energizing pulse to a drive coil only during one-quarter of the path of travel of a conveyor pan on a vibratory conveyor. These systems provide very limited, and often no ability to regulate the vibration frequency or vibration amplitude of the path traveled by a conveyor pan on a vibratory conveyor. The rather limited ability to control vibration amplitude or vibration frequency is directly related to the limited ability to provide an enabling control signal to a current switch that can be used to deliver an electrical current to a drive coil coupled to a vibratory conveyor. Without the ability to effective control the current switch, such vibratory conveyor systems cannot regulate the period or frequency of motion of a conveyor pan on a vibratory conveyor.

Controlling vibration amplitude is yet another challenge in existing vibratory conveyor control systems. In such systems, a peak vibration amplitude signal measured by a motion sensor must often be compared with a user-selected amplitude value. Vibration amplitude often can only be adjusted based on such comparisons made at the start of an energizing pulse to a drive coil and for the one-quarter of a period through which the coil may be energized. Such systems provide limited opportunities to control vibration amplitude over the entire period, or even one-half of the period, over which a current switch is enabled.

Therefore, a need exists for a closed loop control system for a vibratory conveyor that provides greater control over the generation and switching of electrical current for regulating the vibration amplitude and vibration frequency of a conveyor pan mounted on a vibratory conveyor. In such a system, the sensing, signal processing, translating and controlling capabilities must be implemented using a minimum amount of electrical circuitry to reduce total manufacturing costs and total power consumption, while providing significantly greater control over vibration amplitude, vibration frequency and reduced physical stress on a vibratory conveyor.

SUMMARY OF THE INVENTION

The present invention contemplates, in one embodiment, a system for controlling a vibratory conveyor on which a conveyor pan is mounted, the system including a drive coil for driving the vibratory conveyor with a vibrating motion; a sensing subsystem for detecting the vibrating motion of the conveyor pan; a controller coupled to the sensing subsystem for generating at least one control signal to be applied to the drive coil, the controller generating at least one control signal by producing a digitized signal from the detected vibrating motion and computing three intermediate timing positions in each period of the digitized signal; and a switching subsystem for applying at least one control signal generated by the controller to the drive coil. At least one control signal is applied between the first and third intermediate timing positions in each period of the digitized signal.

The present invention also contemplates a method used in the system for controlling a vibratory conveyor having a conveyor pan mounted thereon and a drive coil. The method involves sensing the vibration motion of the conveyor pan on the vibratory conveyor and producing a periodic vibration signal based on the sensed vibration motion. Additional steps in the method involve processing the periodic vibration signal, generating at least one control signal based on the processed periodic vibration signal and driving the vibratory conveyor with a drive current based on at least one control signal. The drive current is applied to the vibratory conveyor from a first intermediate point to a second intermediate point, the first intermediate point representing a point farthest from the drive coil and the second intermediate point representing a point closest to the drive coil.

The present invention provides a vibratory conveyor control system having significantly reduced noise since an insulated gate bipolar transistor (IGBT) is used in place of a pulsed silicone controlled rectifier (SCR). A pulsed SCR provides a short, sharp pulse of electrical current that can physically stress the vibratory conveyor system. In its place, an IGBT is substituted that provides electrical current over longer periods of time without the necessity to deliver current in sharp pulses. The use of IGBT's also significantly reduces the manufacturing cost of the system. A seventy-five percent reduction in manufacturing cost can be achieved by implementing the system with IGBT's instead of SCR's.

The present invention also provides significantly less physical stress to the vibratory conveyor control system. In particular, the mechanical stress on the system is reduced since the drive coil applies electrical current to the vibratory conveyor when the conveyor pan 102 mounted on the vibratory conveyor is farthest from the drive coil. An increasing level of electrical current is applied between the point farthest from the drive coil to a crossover point midway between the farthest point and the drive coil. After the conveyor pan crosses the crossover point, the drive coil applies progressively less electrical current until the point at which the conveyor pan reaches a point of closest approach to the drive coil. By regulating the delivery of electrical current to the vibratory conveyor in this manner, the physical stress on the vibratory conveyor is reduced while pulling the conveyor pan from a point farthest from the drive coil to a point closest to the drive coil.

The system and method comprising the present invention provide greater control over vibration frequency and vibration amplitude of a vibratory conveyor. Greater control of these factors is made possible since the system regulates the amount of electrical energy instead of the time intervals in which electrical current can be switched to the drive coil. The invention also provides significant manufacturing cost savings and greatly reduces the physical stress on a vibratory conveyor.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
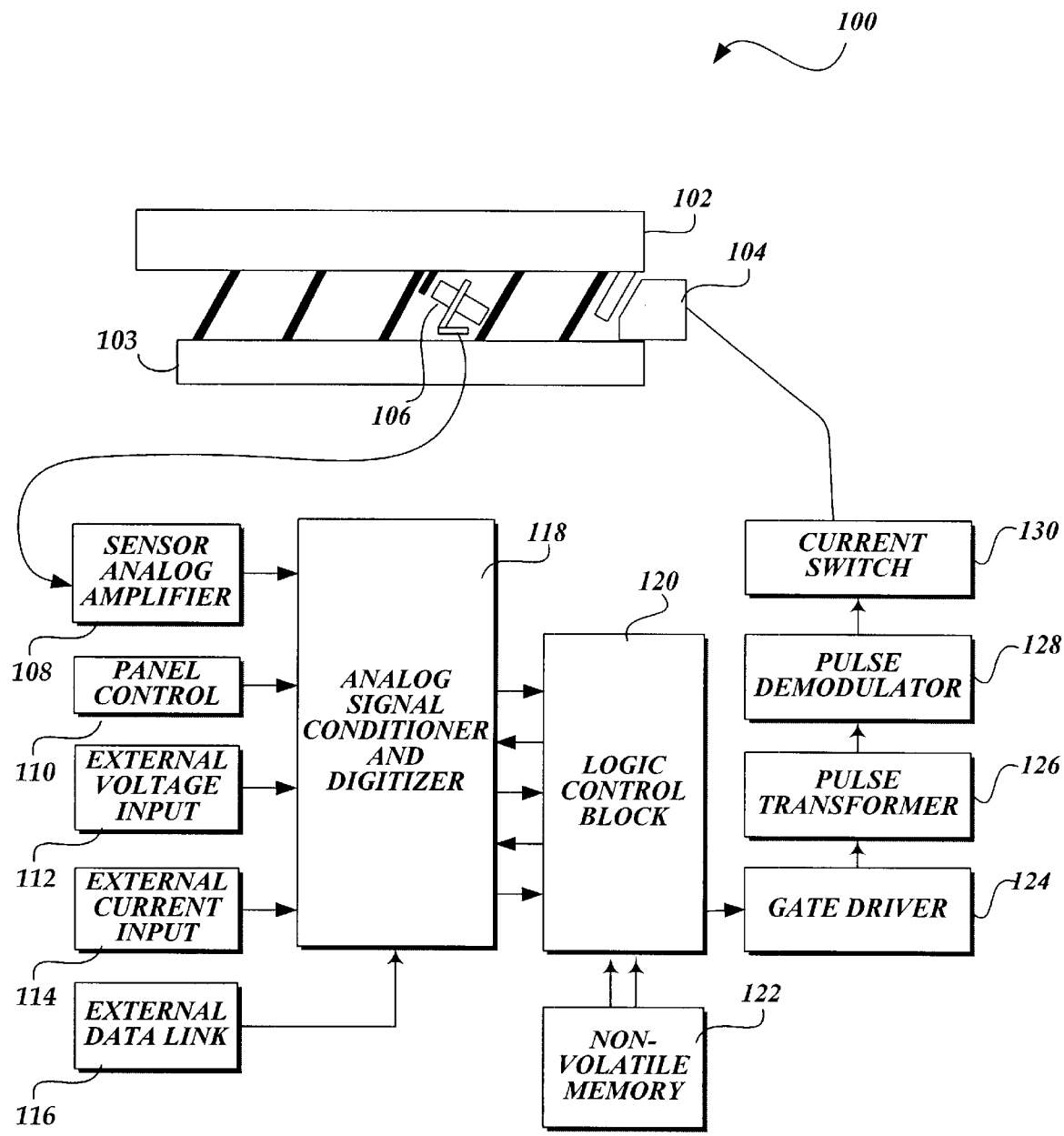
FIG. 1 is a block diagram of a vibratory conveyor control system.

FIG. 1 illustrates a system for controlling a vibratory conveyor of the type with which the present invention is useful. The system 100, illustrated in FIG. 1, includes a conveyor frame 103, a conveyor pan 102, a drive coil 104, a sensor 106, and several system components. The sensor 106 is coupled to one of these components, a sensor analog amplifier 108. Additional system components include panel control 110, external voltage input 112, external current input 114, and external data link 116. Each of these components provides an input to analog signal conditioner and digitizer 118. Analog signal conditioner and digitizer 118 receives an analog input signal from sensor analog amplifier 108, which signal is based on the readings taken by the sensor 106 of the direction and displacement of the conveyor pan 102 mounted on the vibratory conveyor.

The analog input signal is converted into digital form in analog signal conditioner and digitizer 118 and subsequently transmitted to logic control block 120. A non-volatile memory 122 provides an input to the logic control block 120 and can also be used to store an operating frequency for driving the vibratory conveyor, the vibration amplitude of the last signal used to drive the vibratory conveyor, and the switching profile of the last current signal used to control the drive coil 104.

The output of the logic control block 120 is a carrier frequency signal and a current switch enable signal. The carrier frequency signal and the current switch enable signal are provided as inputs to the gate driver 124 which uses these signals to produce an amplified current switch drive signal. The pulse transformer 126 transforms this drive signal into a Pulse-Width Modulated (PWM) signal. The pulse demodulator 128 demodulates the PWM signal and produces a demodulated signal as an input to the current switch 130. The current switch 130 switches an electrical current controlled by the demodulated signal received on its input that causes the drive coil 104 to drive the conveyor pan 102 at a specific vibration amplitude and vibration frequency.

Figure 2:
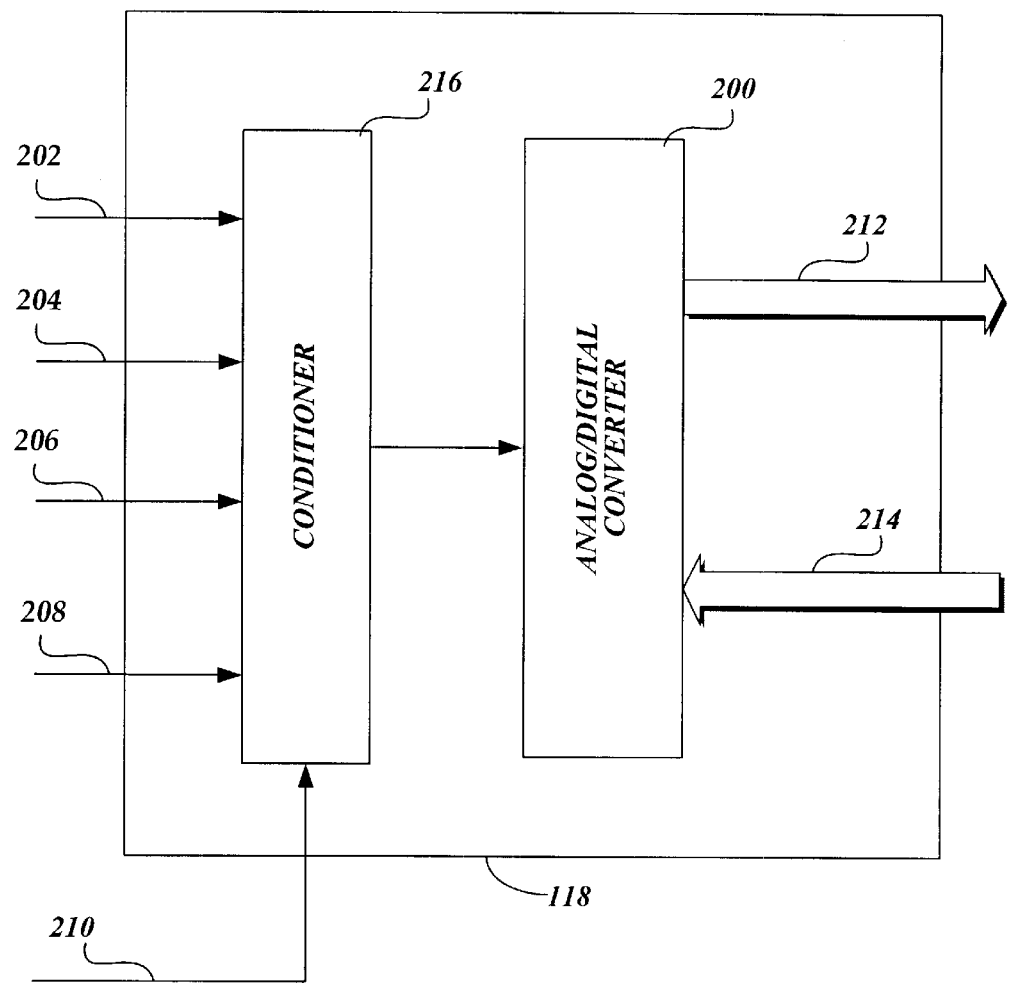
FIG. 2 is a functional block diagram of an analog signal conditioner and digitizer for use in the system illustrated in FIG. 1 formed in accordance with the present invention.

FIG. 2 illustrates an embodiment of an analog signal conditioner and digitizer 118 including two of its subcomponents and a plurality of its inputs and outputs. This system component operates as a sensor signal processor and is used to condition the analog sensor signal that is received from the sensor 106 and amplified by the sensor analog amplifier 108. Conditioner 216 processes the analog sensor signal received from the sensor analog amplifier 108 to remove any quiescent noise on this signal. Analog/digital converter 200 converts the conditioned analog sensor signal into a digital signal for use by the logic control block 120. The analog sensor signal is received from sensor analog amplifier 108 on signal input 202, the control input 204 is received from the panel control 110, and the voltage input 206 is received from the external voltage input 112. The current input 208 is received from the external current input 114 and the data link input 210 is received from the external data link 116.

The panel control 110 enables a user to control the vibration amplitude of the conveyor pan 102 on the vibratory conveyor. If an increase in amplitude is indicated on the panel control 110, an increase in the external voltage input 112 and the external current input 114 will be produced on the inputs 206 and 208 to the analog signal conditioner and digitizer 118. Additional data may be received on the input 210 from the external data link 116 for the processing of the analog sensor signal by the conditioner 216. The data signal from the external data link 116 provided on the data link input 210 is used to select one of the analog signals on each of the inputs to the analog signal conditioner/digitizer 118 from the panel control 110, the external voltage input 112, and the external current input 114. The analog/digital converter 200 produces a periodic digitized signal from the analog sensor signal received from the sensor 106. The digitized signal has the same period as the analog sensor signal and is transmitted to the logic control block 120 on the output 212.

Figure 3:
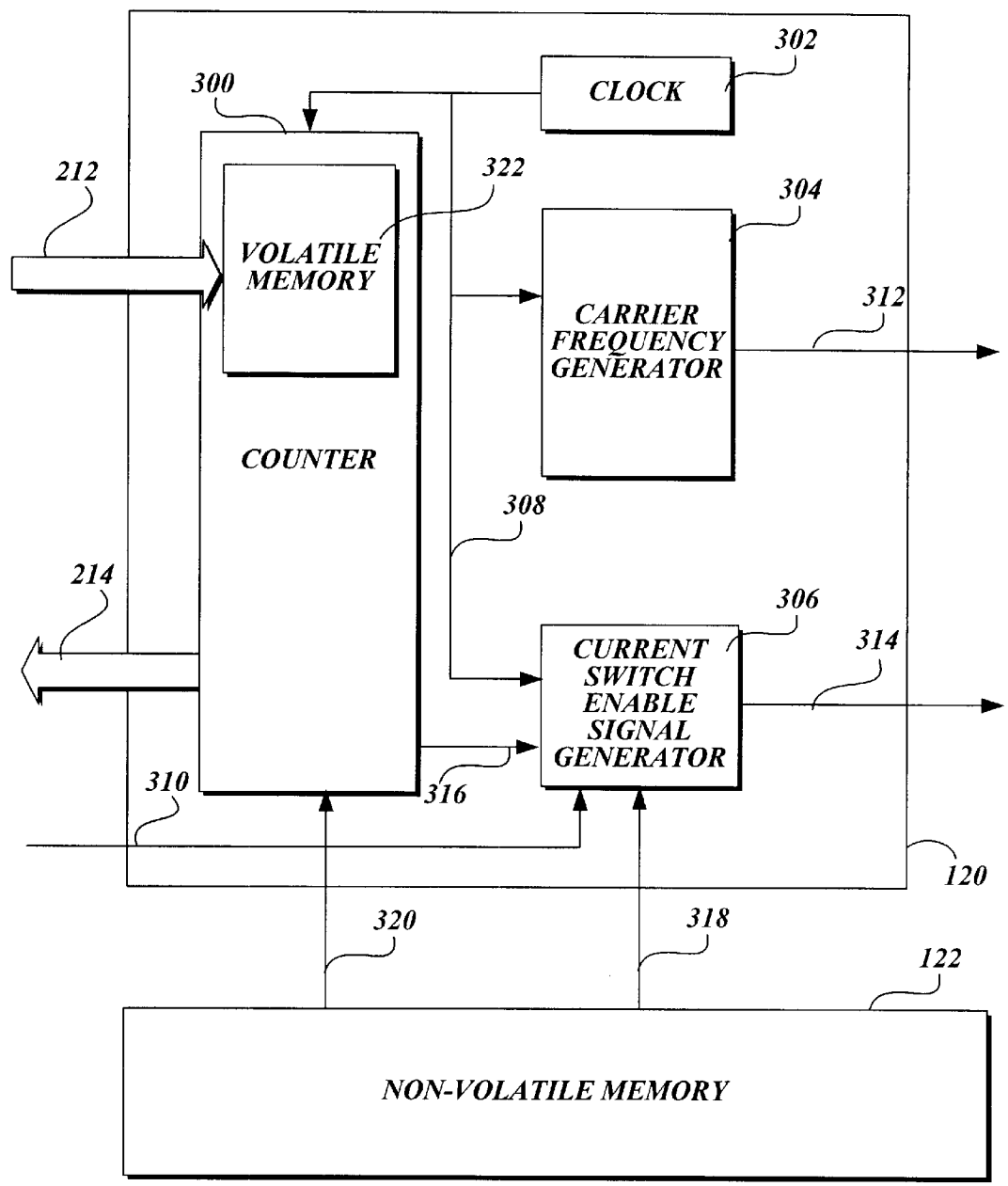
FIG. 3 is a functional block diagram of a logic control block for use in the system illustrated in FIG. 1 formed in accordance with the present invention.

FIG. 3 illustrates the logic control block 120 and several of its functional components. The logic control block 120 includes clock 302, carrier frequency generator 304, current switch enable signal generator 306, and counter 300. A timing signal produced the clock 302 is used by the counter 300 to store data received on the input 212 from the analog signal conditioner and digitizer 118. The counter 300 also includes a volatile memory 322 for storing a count number and a value equal to one-half of the count number. A default count number is stored in the non-volatile memory 122 and subsequently loaded into the volatile memory 322 during the selection of the initial operating frequency and amplitude for the system 100, as represented by step 602 in FIG. 6a.

The counter 300 computes intermediate operating points on the digitized signal produced by analog signal conditioner and digitizer 118 by counting down from the count number value stored in the volatile memory to zero. Time count values corresponding to the intermediate operating points are generated on line 316 as the counter 300 counts down from the count number value. A time count value for each intermediate operating point is transmitted to current switch enable signal generator 306 on line 316 along with the timing signal from the clock 302 on line 308. The time count values and the timing signal are used by the signal generator 306 to generate a current switch enable signal on line 314.

Figure 7:
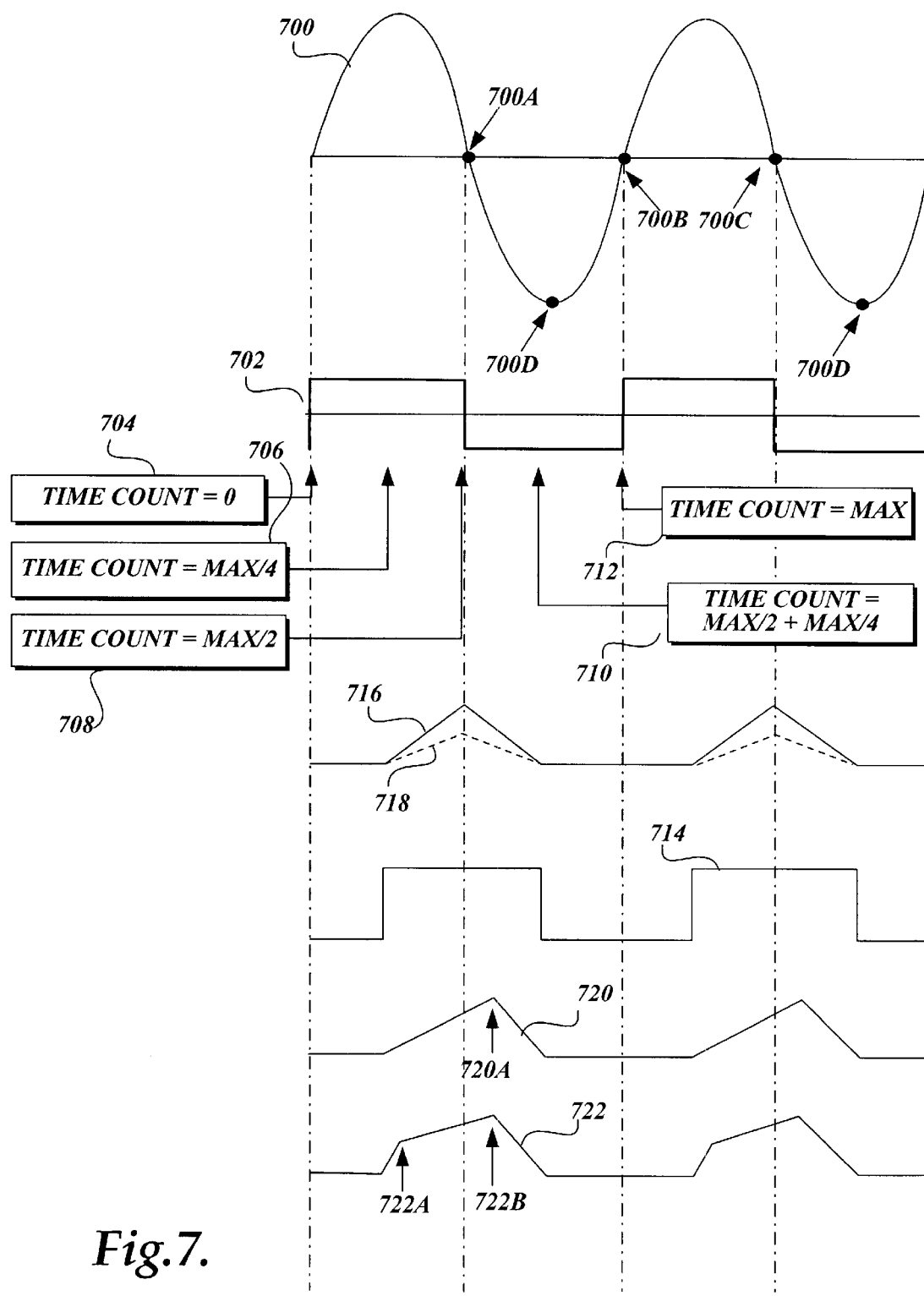
FIG. 7 illustrates representative waveforms that are generated by the system illustrated in FIG. 1 in accordance with the present invention.

The clock 302 is also used by carrier frequency generator 304 to produce a high-frequency carrier signal that is modulated onto the current switch enable signal produced by the current switch enable signal generator 306. The high-frequency signal produced by carrier frequency generator 304 includes an integer number of cycles and is transmitted to gate driver 124 on line 312. In a preferred embodiment, carrier frequency generator 304 generates a carrier signal having a frequency of 500 kHz. A signal pattern representative of the enable signal generated by current switch enable signal generator 306 on line 314 is shown in FIG. 7 as signal 714.

The input line 310 is coupled to the panel control 110 and is used to transmit an amplitude control code to the current switch enable signal generator 306 to generate a current switch enable signal on line 314 with an embedded amplitude code indicating an amplitude for the coil current to be produced and switched by the current switch 130. The output line 214 from the counter 300 includes timing information to be used by analog signal conditioner and digitizer 118 for the timed transmission of the periodic digitized signal from the analog signal conditioner and digitizer 118 to the logic control block 120.

The non-volatile memory 122 is connected to the logic control block 120 by lines 318 and 320. The non-volatile memory 122 is used to store the last vibration frequency of the vibratory conveyor and the default count number described above. The default count number is transmitted to the counter 300 on line 320, and a stored vibration frequency, vibration amplitude or current profile are transmitted to the current switch enable signal generator on line 318. The non-volatile memory 122 can also be used to store the last vibration amplitude as well as the profile for the drive coil current last used for controlling the operation of the vibratory conveyor.

In lieu of a previously stored vibration amplitude or current profile, the initial operation of the system 100 may use a vibration frequency that is switch selected or preprogrammed into the logic control block 120. Regardless of whether a switch selected, preprogrammed or previously stored vibration frequency is used, an initial drive current can be transmitted to the drive coil 104 to ensure that any movement of the conveyor pan 102 can be detected by the sensor 106.

Figure 4:
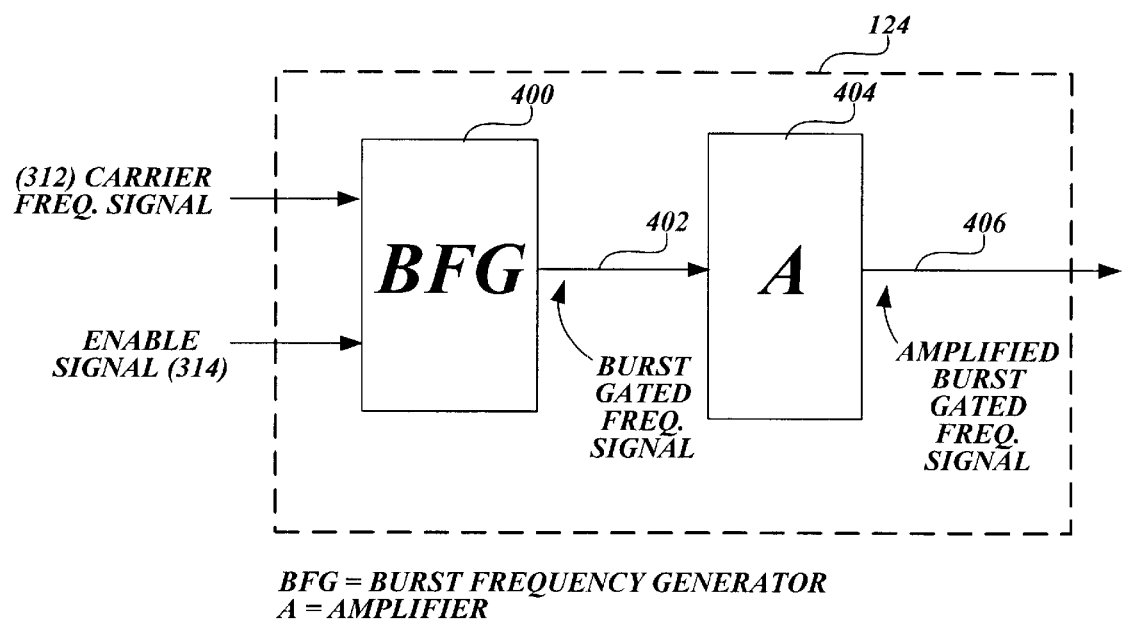
FIG. 4 is a functional block diagram of a gate driver for use in the system illustrated in FIG. 1 formed in accordance with the present invention.

FIG. 4 illustrates a block diagram of the gate driver 124. The gate driver 124 receives the carrier frequency signal on line 312 and the current switch enable signal on line 314 as inputs to the burst frequency generator 400. The burst frequency generator 400 modulates the enable signal on line 314 with the carrier frequency signal on line 312. A modulated burst gated frequency signal is generated by burst frequency generator 400 on line 402, which signal is subsequently amplified by amplifier 404. An amplified burst gated frequency signal is produced by amplifier 404 on output 406. In a preferred embodiment the burst gated frequency signal on line 402 is amplified from a standard digital input voltage of 5 volts to an amplified burst gated frequency signal having an amplitude of 18 volts. The burst gated frequency signal on line 402 is amplified by the amplifier 404 to minimize the effect of energy losses on signal amplitude resulting from the processing of the signal in other components that are used for generating and switching a drive coil current.

Figure 8:
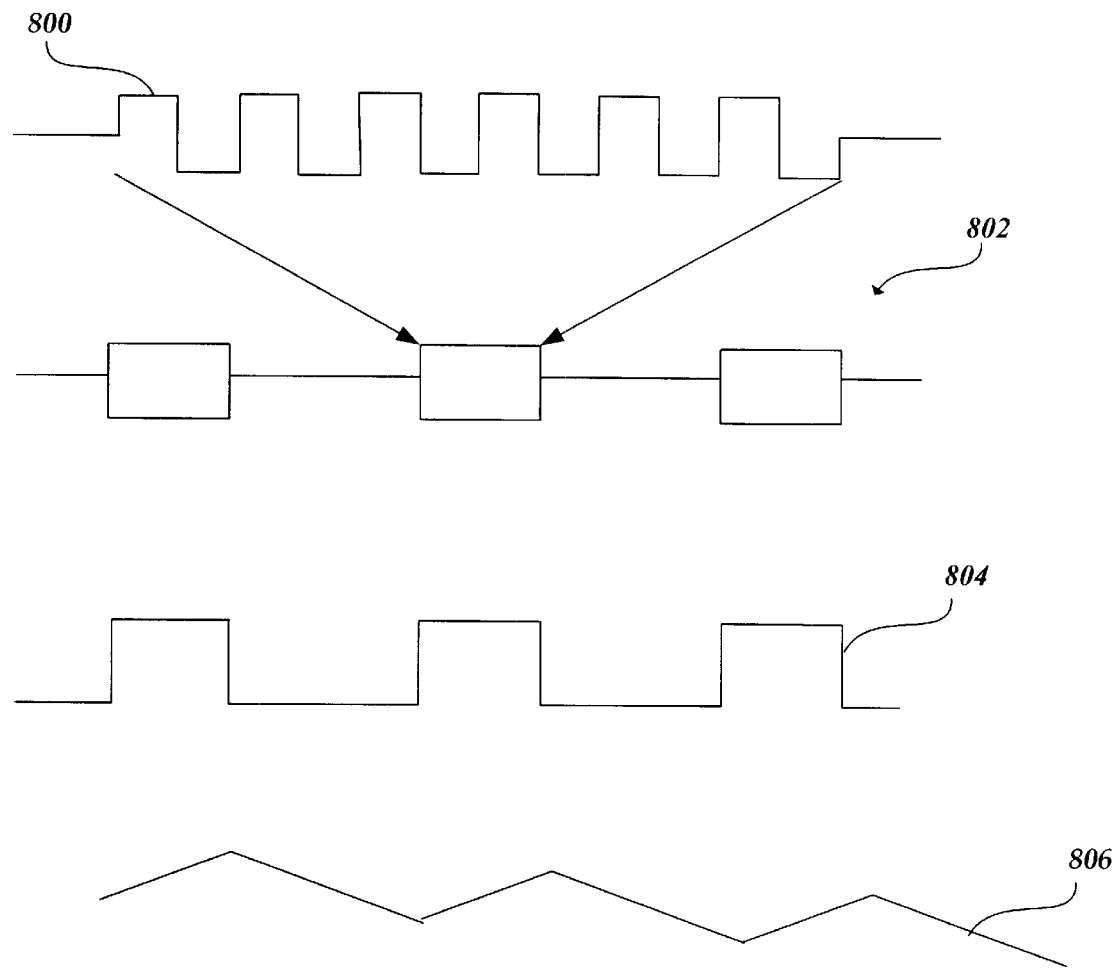
FIG. 8 illustrates additional representative waveforms that are generated by the system illustrated in FIG. 1 in accordance with the present invention.

FIG. 8 shows a segment of the amplified burst gated frequency signal produced by the gate driver 124. By modulating the enable current switch signal 714 shown in FIG. 7 onto the carrier frequency signal 800, only those segments of the carrier frequency signal 800 aligned with the active high regions of the enable current switch signal 714 appear in the amplified burst gated frequency signal output by the gate driver 124 on line 406. Thus, in each active high region of enable current switch signal 714 there are pulses from the carrier frequency signal 800 at a fixed frequency in the amplified burst gated frequency signal, a segment of which is shown in FIG. 8. In a preferred embodiment, the frequency of the carrier signal 800 is 500 kHz and, in addition, each cycle of the carrier frequency signal 800 in the amplified burst gated frequency signal output by gate driver 124 includes an integer number of cycles from the carrier frequency signal 800.

The amplified burst gated frequency signal is transformed by pulse transformer 126 into a Pulse Width Modulated (PWM) signal 802, which signal is also shown in FIG. 8. In a preferred embodiment, the PWM signal has a frequency of 14 kHz. In the process of transforming the amplified burst gated frequency signal, pulse transformer 126 generates pulses with widths that may vary based on the amount of electrical current required to switch drive coil 104. Each darkened box shown in the PWM signal 802 of FIG. 8 is an individual pulse representing groupings of pulses from the amplified burst gated frequency signal. A greater or lesser number of pulses from the amplified burst gated frequency signal may be included in each pulse of the PWM signal 802 depending on whether an increased or decreased amount of electrical current is to be switched to drive coil 104. A period of the PWM signal includes a pulse and the region separating the pulse from the next succeeding pulse. In each period of the PWM signal 802, the widths of the pulses may vary but the frequency of the PWM signal 802 will remain the same.

Each PWM pulse can be lengthened or shortened depending on the need for drive coil current. Increasing the length of each PWM pulse increases the current delivered to drive coil 104. Shortening the length of each PWM pulse reduces the drive coil current switched by current switch 130. By controlling the lengths of each PWM pulse, the amount of drive current switched by current switch 130 can be regulated over the entire path of travel of the conveyor pan 102 from a point farthest from the drive coil 104 to a point closest to the drive coil 104. The effect of increasing or decreasing the widths of pulses in the PWM signal 802 is shown graphically by the drive coil current signal profiles 716 and 718. These current profiles differ only in the amplitude of the drive coil current switched by the current switch 130 to the drive coil 104, current profile 716 representing a drive coil current with a greater amplitude than the current profile 718.

In particular, as the conveyor pan 102 returns from a point farthest from the drive coil 104 to a midpoint 700a on the vibratory conveyor, an increasing amount of drive coil current is switched to the drive coil 104, as is shown graphically by the increasing slopes on signals 716 and 718. The conveyor pan is at the point farthest from the drive coil 104 at each maximum point on signal 700. The widths of the PWM pulses between a point farthest from the drive coil 104 and a midpoint (700a, 700c) on the vibratory conveyor are a greater portion of each period in the PWM signal 802.

Likewise, as the conveyor pan moves beyond the midpoint 700a on the vibratory conveyor to a point of closest approach to the drive coil 104, the drive coil current is progressively reduced to prevent the vibratory conveyor from being driven at a non-resonant operating frequency. The conveyor pan 102 is at the point of closest approach to the drive coil 104 at each minimum point 700d on signal 700. The widths of the PWM pulses between these two locations are a lesser portion of each period in the PWM signal 802.

After reaching the point of closest approach 700d, the conveyor pan 102 moves toward the midpoint 700b and back to the point farthest from the drive coil 104. Once reaching the point farthest from the drive coil 104, electrical current will again be applied to drive the conveyor pan 102 back toward the drive coil 104, initially with gradually increasing current and after crossing the midpoint 700c with gradually decreasing current. Thus, a significant advantage provided by the present invention is the consistent delivery of current from the farthest point from the drive coil 104 to the closest point to the drive coil 104.

As the amplitude of the amplified burst gated frequency signal generated by the gate driver 124 is transformed by the pulse transformer 126 to the PWM signal 802, some of the electrical energy is lost and the resulting PWM signal 802 is generated with an amplitude that is lower than the amplitude of the amplified burst gated frequency signal. In a preferred embodiment, the amplitude of the PWM signal 802 is in the range from 16 to 14 volts. The PWM signal 802 is transmitted to the pulse demodulator 128 where it is processed into a demodulated signal 804 that will be the input to the current switch 130.

A variety of electronic devices may be used to implement the current switch 130, including certain MOSFET devices. Among the devices that have been used in control systems for other vibratory conveyors are Silicon Controlled Rectifiers (SCR). The use of these devices, however, can significantly increase the cost to manufacture and maintain such control systems. In a preferred embodiment of the present invention, an Insulated Gate Bipolar Transistor (IGBT) is used as the current switch 130 and the demodulated signal 804 is applied to the gate of the IGBT to generate and switch a drive coil current.

The profile of the coil current 806 switched by the current switch 130 to the drive coil 104 increases where there are pulses in the demodulated signal 804. If the demodulated signal 804 is low (i.e., between pulses), the profile of the switched coil current 806 will decrease. Likewise, the amount of coil current 806 switched to the drive coil 104 will increase when the next pulse in the demodulated signal 804 is received at the gate of the IGBT comprising the current switch 130.

Figure 5:
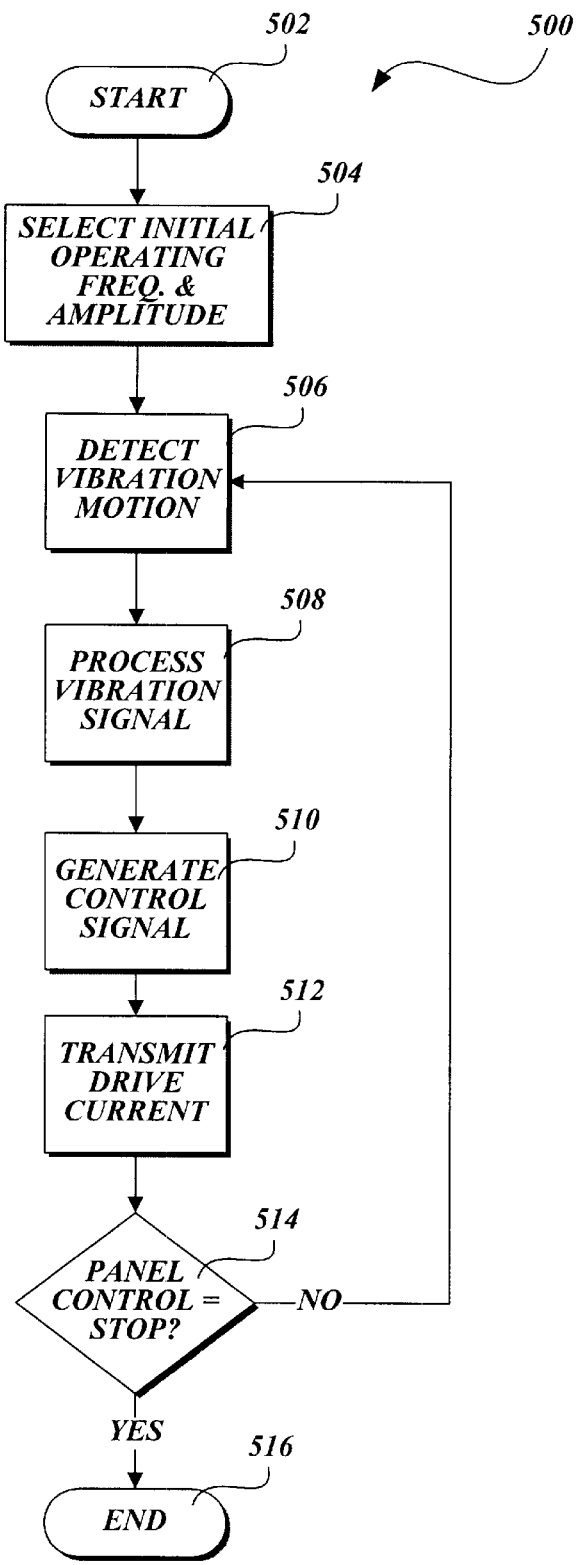
FIG. 5 is a flow diagram illustrating the operation of the system illustrated in FIG. 1 in accordance with the present invention.

FIG. 5 illustrates a method 500 for controlling the vibratory conveyor. Upon system activation (step 502), the system 100 selects an initial operating frequency, an initial operating amplitude (step 504), and loads a default count number into the volatile memory 322 of the counter 300 from the non-volatile memory 122. After loading the default count number into the volatile memory 322, the counter 300 computes a value equal to one-half of the count number that will also be stored in the volatile memory 322.

In general, the initial vibration frequency and the initial vibration amplitude may be stored in the non-volatile memory 122, selected by a user on the panel control 110, or preprogrammed into the memory of the logic control block 120. The control signal produced by the logic control block 120 specifying an initial vibration frequency and an initial vibration amplitude is an enable signal for the current switch 130. This enable signal regulates the switching of electrical current by the current switch 130 to the drive coil 104.

The sensor 106 detects the motion of the conveyor pan 102 in response to the drive signals generated by the drive coil 104, as shown in step 506. The vibration signal resulting from the detection of the vibration motion of the conveyor pan 102 by the sensor 106 is amplified, processed and analyzed to determine whether the operating frequency is equal to the resonant frequency of the vibratory conveyor, as shown in step 508. The operating frequency of the vibration signal is adjusted to the resonant frequency of the vibratory conveyor during the processing of the vibration signal in step 508. Adjusting the operating frequency requires a continual comparison of the frequency of an enable signal generated by the current switch enable signal generator 306 with a detected vibration motion signal, each vibration signal representing the actual movement of the conveyor pan 102 on the conveyor frame 103. The resonant frequency of the system is achieved by maintaining a specific phase relationship between the enable signal and the detected vibration motion signal. In a preferred embodiment, the maximum phase error between these signals must not exceed +/−90 degrees for mechanical resonance.

A periodic digitized signal is produced from the vibration motion signal and used to generate a control signal that will adjust the vibration amplitude and vibration frequency of the vibratory conveyor, as shown in step 510. The control signal is the amplified burst gated frequency signal generated by the gate driver 124. This control signal is further processed and used to control the switching of drive current from the current switch 130 to the drive coil 104. The transmission of switched drive current from the current switch 130 to the drive coil 104 based on an adjusted vibration amplitude and an adjusted vibration frequency of the generated control signal is represented by step 512.

After transmission of the control signal and the subsequent generation of the drive coil current, the panel control 110 is checked to determine if the user has selected "stop" or otherwise specified the termination of conveyor operation, as shown in step 514. If "stop" has been indicated on the panel control 110, the process will end at step 516. If "stop" has not been indicated on the panel control 110, the process will continue at step 506 with the continued detection of vibration motion by the sensor 106.

Figure 6A:
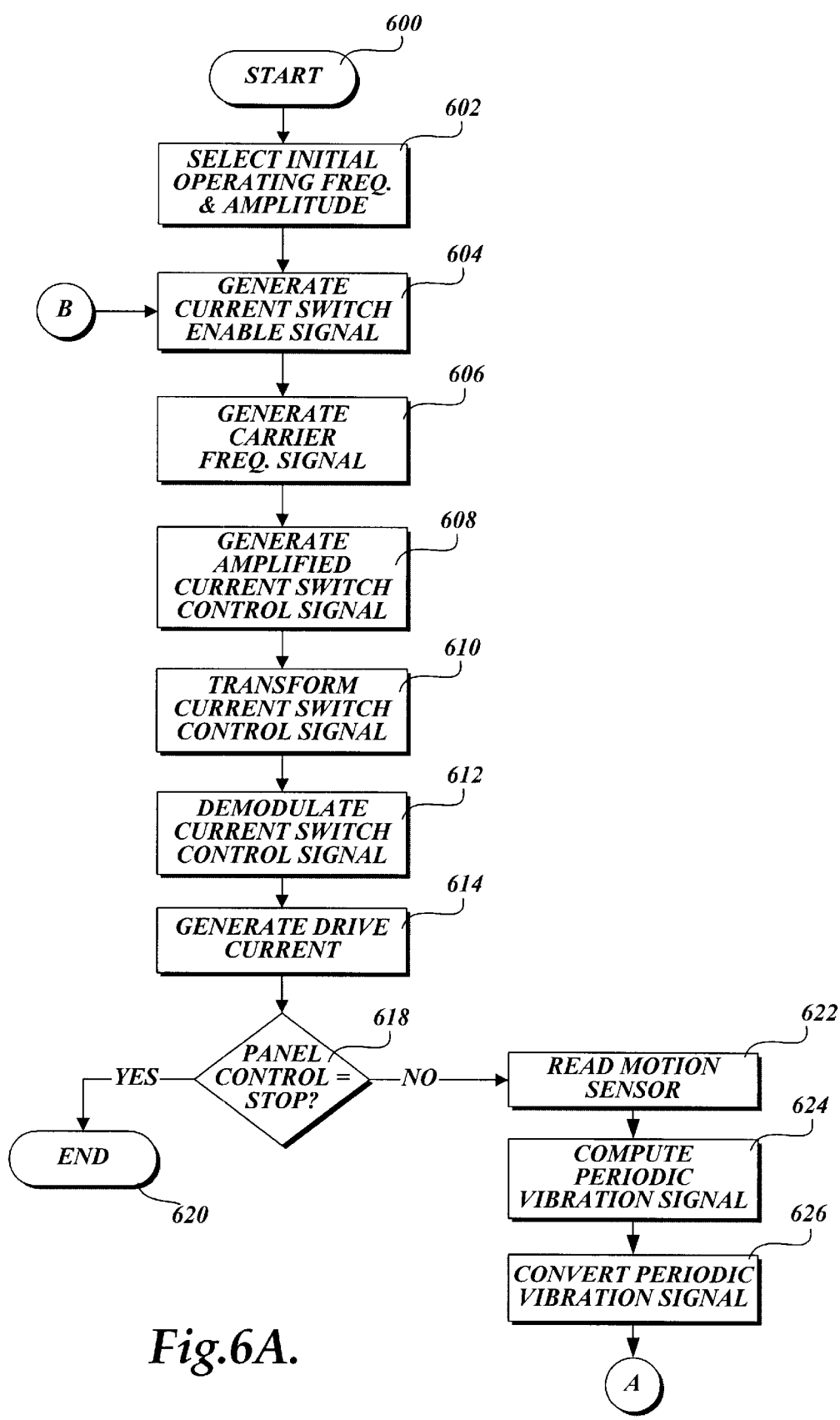
FIG. 6a is the first part of a detailed flow diagram illustrating the operation of the system shown in FIG. 1 in accordance with the present invention.
Figure 6B:
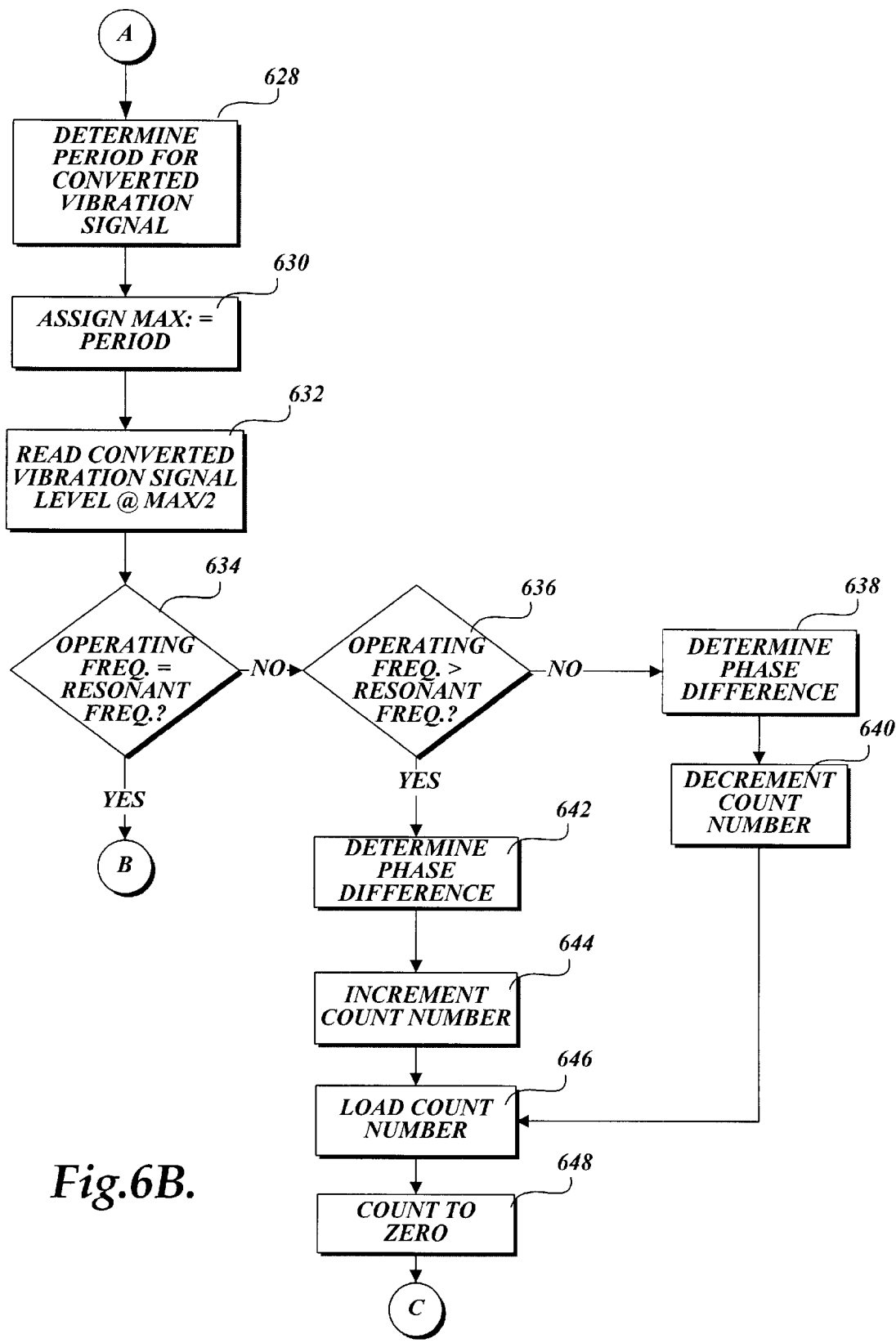
FIG. 6b is the second part of a detailed flow diagram illustrating the operation of the system shown in FIG. 1 in accordance with the present invention.
Figure 6C:
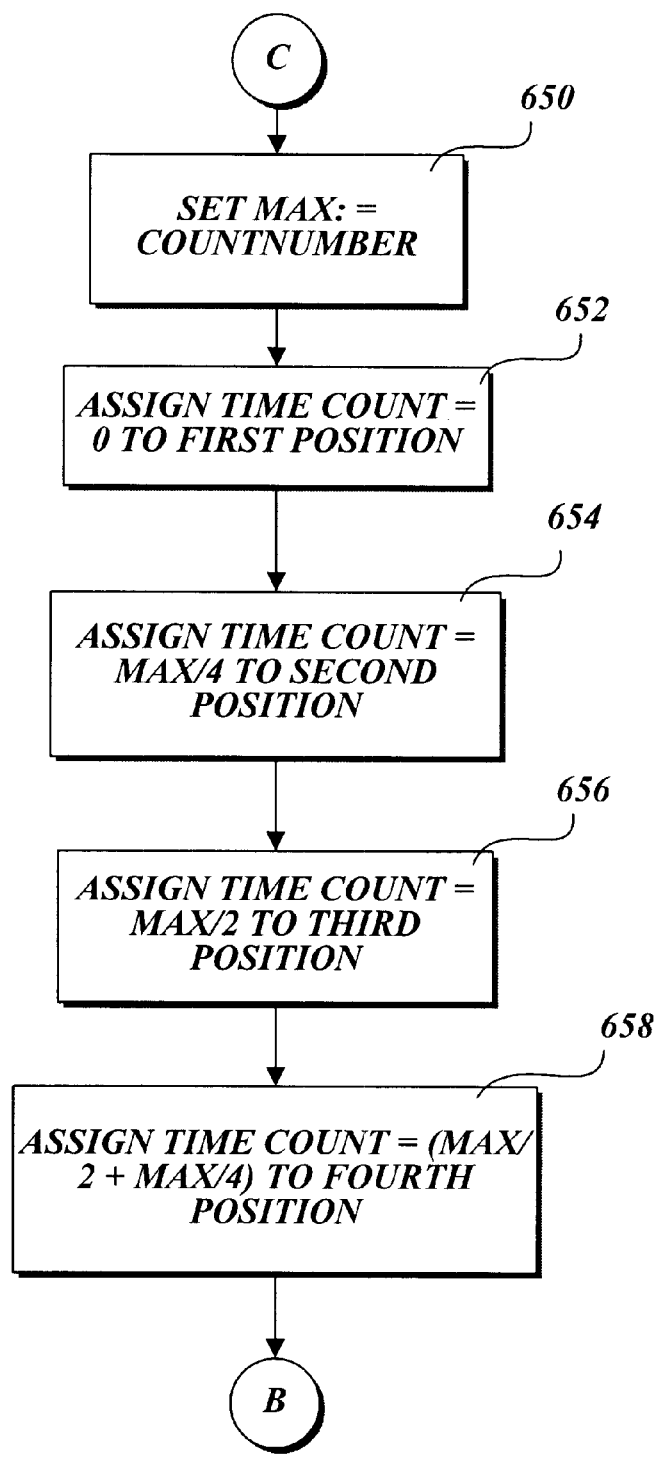
FIG. 6c is the third part of a detailed flow diagram illustrating the operation of the system shown in FIG. 1 in accordance with the present invention.

The method of operating the control system for the vibratory conveyor illustrated in FIG. 5 is set forth in greater detail in FIGS. 6a, 6b and 6c. As shown in FIG. 6a, the control method starts at step 600 and commences with the selection of an initial operating frequency and an initial operating amplitude for the vibratory conveyor, as shown in step 602. The selection of the initial operating frequency in step 602 involves retrieving a previously stored operating frequency from the non-volatile memory 122, retrieving a preprogrammed operating frequency stored in logic control block 120, or receiving a control signal from the panel control 110 representing a user specified an initial operating frequency.

The selection of an initial operating amplitude for the vibratory conveyor occurs in a similar fashion. An initial operating amplitude is selected by retrieving a previously stored operating amplitude from the non-volatile memory 122, retrieving a pre-programmed operating amplitude stored in the logic control block 120, or receiving an amplitude control signal from the panel control 110 specifying an initial operating amplitude. In addition, a default count number is preloaded into the volatile memory 322 in the counter 300 from the non-volatile memory 122. The counter 300 also computes and stores a value equal to one-half of the default count number in the volatile memory 322.

The selected signal frequency is used to generate the current switch enable signal, as shown in step 604. A carrier frequency signal is also generated, as shown in step 606. The current switch enable signal and the carrier frequency signal are both generated in logic control block 120. After generation of these signals, an amplified current switch enable signal is generated in step 608. This amplified signal is the burst frequency gated signal produced by the gate driver 124.

This amplified signal is used by the pulse transformer 126 to produce a transformed current switch enable signal, as shown in step 610. This transformed enable signal is the PWM signal 802 shown in FIG. 8. The transformed signal is demodulated at step 612 to produce demodulated current switch enable signal 804 which is also shown in FIG. 8. The demodulated signal is used by the current switch 130 to generate a drive coil current, as shown in step 614. This current is switched to the drive coil 104 on the vibratory conveyor. After generating the drive coil current, if the panel control 110 indicates "stop," (step 618) the control process will terminate, as shown at step 620. However, if the panel control does not indicate "stop," then data from the motion sensor 106 will be read as shown at step 622 and a periodic vibration signal will be computed from the data read by the motion sensor 106, as shown in step 624. A representation of a periodic vibration signal 700 reflecting the change in position of the conveyor pan 102 over time is shown in FIG. 7. The periodic vibration signal 700 will be converted to a periodic digitized signal having a period and frequency that are equal to the period and frequency of the vibration motion signal 700 computed from the data read by the motion sensor 106, as shown at step 626.

FIG. 6b illustrates additional steps in the method for controlling the vibratory conveyor. After conversion of the periodic vibration signal, the period of the periodic digitized signal 702 is determined at step 628. Once determined, the value of the period is assigned to the variable MAX, as shown at step 630, and stored in the volatile memory 322. The assignment is represented formally by the expression MAX:=PERIOD. The counter 300 also computes a value that is one-half of the value stored in the variable MAX (step 632) (i.e., MAX/2) and stores this value in the volatile memory 322.

After storing both the MAX and MAX/2 values in the volatile memory 322, the counter 300 will read the value of the periodic digitized signal 702 at the time count position 708 (Time Count=MAX/2) to determine whether the vibratory conveyor is operating at, above or below its resonant frequency, as shown at step 634. If the value of the periodic digitized signal 702 at MAX/2 is a "HIGH" signal, the then current operating frequency is determined to be above the vibratory conveyor's resonant frequency (step 636). Alternatively, if the value of the periodic digitized signal 702 at MAX/2 is a "LOW" signal, the then current operating frequency is determined to be below the resonant frequency of the vibratory conveyor. If a "HIGH" to "LOW" transition is detected at MAX/2, the then current operating frequency is determined to be equal to the resonant frequency of the vibratory conveyor and the control process returns to step 604 for the generation of a current switch enable signal 714 that is equivalent to the previously generated enable signal.

However, if the operating frequency of the vibratory conveyor is determined to be above the resonant frequency, then the extent to which the operating frequency exceeds the resonant frequency is determined by comparing the phase of the periodic digitized signal 702 and the phase of the current switch enable signal 714 used to generate the current vibration motion signal. The phase difference between these two signals is determined at step 642 and the default count number stored in the volatile memory 322 in the counter 300 will be incremented by an amount equal to this phase difference, as shown at step 644. This incremented count number will be stored in the volatile memory 322 in place of the originally stored default count number along with a value representing one-half of the incremented count number, as shown at step 646.

After the default count number and the value equal to one-half of the count number are loaded into the volatile memory 322 of the counter 300, an initial current switch enable signal 714 will be generated as the counter 300 counts down from the default count number value to zero (step 648). The initial value of the variable MAX is equal to the value of the default count number. Additional values are also computed for MAX/2, MAX/4 and MAX/2+MAX/4, each representing a specific Time Count. Hence, five Time Count values are computed and generated by the counter 300 as it counts down from the default count number to zero.

Although the difference in time between each Time Count does not vary, the start time at which this sequence of Time Count values are generated can vary depending on whether the operating frequency of the vibratory conveyor is above or below the resonant frequency for the vibratory conveyor. If the operating frequency is above the resonant frequency of the vibratory conveyor, the sequence of Time Count values will be delayed by an amount equal to the phase difference between the periodic digitized signal and the current switch enable signal 714. In effect, the starting transmission time of the current switch enable signal 714 produced by the current switch enable signal generator 306 will be delayed by an amount equal to this phase difference.

Likewise, the starting transmission time of the current switch enable signal 714 will be advanced by an amount equal to the phase difference if the operating frequency of the vibratory conveyor is below its resonant frequency. The determination of the phase difference between the periodic digitized signal 702 having the then current operating frequency of the vibratory conveyor and the current switch enable signal 714 and its transmission frequency is shown at step 638. The default count number stored in the volatile memory 322 of the counter 300 will be decremented by an amount equal to the phase difference (step 640) and stored in place of the default counter number in the volatile memory 322, as shown at step 646. A value equal to one-half of the decremented count number is also computed and stored in the volatile memory 322 at step 646.

FIG. 6c illustrates additional aspects of the present invention. At step 650, the variable MAX is assigned the value of the count number stored in the volatile memory 322. This assigned is represented by the expression MAX:=COUNTNUMBER. This value may be the default count number retrieved from the non-volatile memory 122, an incremented count number or a decremented count number. The assigned count number indicates the period of the current switch enable signal 714.

In addition to the count number assignment, several different time count positions are determined and transmitted to the current switch enable signal generator 306 for the generation of the current switch enable signal 714. Each time count position is represented by a different value for a common variable Time Count. For the first time position, the Time Count variable is assigned the value 0, as shown at step 652. The Time Count variable is assigned the value MAX/4 for the second time position, as shown at step 654. The Time Count variable is assigned the value MAX/2 for the third time position, as shown at step 656. Step 658 shows the value (MAX/2+MAX/4) assigned to the Time Count variable at the fourth time count position. After assigning values for each time count position, the process returns to step 604, shown in FIG. 6a, and continues with the generation of a new current switch enable signal 714 and new a carrier frequency signal 800, as shown at step 606.

Each time count position marks a specific point in time on the current switch enable signal 714 and the periodic digitized signal 702, as shown in FIG. 7. These time count positions are shown in this figure for the case when the actual operating frequency is equal to the resonant frequency of the vibratory conveyor. As shown in the figure, a period of the current switch enable signal 714 is shown at time count position 712 with the variable assignment Time Count=MAX. The first time count position 704, the second time count position 706, the third time count position 708 and the fourth time count position 710 are each shown in this figure with the variable assignments specified as shown in method steps 652, 654, 656 and 658.

A number of different current profiles may be generated by the current switch 130 as it switches electrical current to the drive coil 104. Drive current profiles 716 and 718 are two possibilities; however, additional drive current profiles may also be used in the present invention. Drive current profiles 720 and 722, also shown in FIG. 7, are among these additional possibilities. Drive current profile 720 includes one peak switching current position 720a that may occur at any point between time count position 708 (Time Count=MAX/2) and time count position 712 (Time Count=MAX).

The drive current profile 720 shows that progressively increasing levels of electrical current may be switched to the drive coil 104 when the conveyor pan 102 is positioned at a point farthest from the drive coil 104 to a point approximately midway between the midpoint (700a or 700c) on the conveyor frame 103 and the point of closest approach 700d to the drive coil 104. Afterwards, the drive current is reduced at a rate that is greater than the reduced rate of current transmission for the drive current profile 716 to ensure that the conveyor pan 102 is not driven at an operating frequency that is greater than the resonant frequency for the vibratory conveyor.

Drive current profile 722 includes two peak current positions, 722a and 722b, both of which occur during each active current switching period. The first peak current position 722a occurs ahead of the second peak current position 722b in each active switching period. The first and second peak current positions 722a and 722b may occur at any point between time count position 704 (Time Count=0) and time count position 712 (Time Count=MAX).

Electrical current is increased at two different rates in the drive current profile 722. A first current switching rate is applied starting at a point farthest from the drive coil 104 and a second current switching rate is applied shortly afterwards. This second switching rate is less than the first switching rate, but nonetheless continues to provide a progressively increasing rate of switched current up to a point approximately midway between the midpoint (700a or 700c) on the conveyor frame 103 and the point of closest approach 700d to the drive coil 104. The two peak current positions 722a and 722b may occur at any point within an active current switching period and, therefore, may occur at times that are more or less closely spaced together. Furthermore, the first and second switching rates may be applied for different times within each active current switching period to ensure that the frequency of the vibration motion signal remains at or as close to the resonant frequency of the vibratory conveyor as possible.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for controlling a vibratory conveyor having a conveyor pan mounted thereon, the system comprising:
   a drive coil for driving the vibratory conveyor with a vibrating motion;
   a sensing subsystem for detecting the vibrating motion of the conveyor pan on the vibratory conveyor driven by the drive coil;
   a controller coupled to the sensing subsystem for generating at least one control signal to be applied to the drive coil, the controller computing three intermediate timing positions in each period of a periodic digitized signal, the periodic digitized signal produced by the sensing subsystem from the detected vibrating motion; and
   a switching subsystem for switching a drive signal to the drive coil, the drive signal generated by the switching subsystem, the at least one control signal causing the drive signal to be switched to the drive coil from the first intermediate timing position to the third intermediate timing position in each period of the periodic digitized signal.

2. The system of claim 1 wherein the sensing subsystem comprises a sensor signal processor, a sensor signal amplifier, a motion sensor, a panel control, a voltage source, a current source, and a datalink, the motion sensor coupled to an input of the sensor signal amplifier, the sensor signal processor having a first plurality of inputs, a second plurality of inputs, and an output, the sensor signal amplifier, the panel control, the voltage source, the current source, and the datalink each coupled to the first plurality of inputs to the sensor signal processor.

3. The system of claim 2 wherein the panel control includes a variable amplitude control switch for selecting an amplitude of the drive signal generated by the switching subsystem.

4. The system of claim 2 wherein the motion sensor detects the vibrating motion of the conveyor pan on the vibratory conveyor, the detected vibrating motion including a vibration amplitude and a vibration frequency, the motion sensor producing an analog vibration feedback signal from the detected vibrating motion for amplification by the sensor signal amplifier.

5. The system of claim 4 wherein the sensor signal processor includes a signal conditioner and an analog/digital converter, the signal conditioner coupled to the first plurality of inputs for reducing noise on the amplified analog vibration feedback signal received from the sensor signal amplifier, the analog/digital converter coupled to the signal conditioner for converting the conditioned amplified analog vibration feedback signal to the periodic digitized signal, the analog/digital converter coupled to the second plurality of inputs and the output of the sensing subsystem, the periodic digitized signal transmitted on the output of the sensing subsystem.

6. The system of claim 2 wherein the voltage source is an external voltage source providing 0–10 volts to the sensor signal processor.

7. The system of claim 2 wherein the current source is an external current source providing 4–20 milliamperes of current to the sensor signal processor.

8. The system of claim 2 wherein the controller comprises:
a counter having a volatile memory, the counter coupled to the second plurality of inputs and the output of the sensor signal processor, the counter generating the three intermediate timing positions;
a clock coupled to the counter;
a carrier frequency generator having an output and an input, the output being a first output of the controller, the input coupled to the clock, the carrier frequency generator generating a carrier frequency signal on the first output; and
an enable signal generator having an output and coupled to the clock, the counter and the panel control, the output being a second output of the controller, the enable signal generator generating a current switch enable signal on the second output based on the three intermediate timing positions produced by the counter.

9. The system of claim 8 wherein the carrier frequency generator generates a carrier frequency signal having a frequency of 500 kHz on the first output of the controller.

10. The system of claim 9 further including a non-volatile memory coupled to the enable signal generator and the counter, the memory storing a count number, a vibration amplitude and a vibration frequency, the count number representing a period of the current switch enable signal.

11. The system of claim 10 wherein the vibration frequency stored in the non-volatile memory is a resonant frequency of the vibratory conveyor.

12. The system of claim 10 wherein the enable signal generator generates the current switch enable signal based on a signal value of the periodic digitized signal at a timing position equal to one-half of the count number.

13. The system of claim 12 wherein:
the count number is incremented by an amount representing a phase difference between the enable signal and the periodic digitized signal if the signal value is "HIGH", and
the enable signal generator delays the generation of the current switch enable signal by the amount the count number is incremented.

14. The system of claim 12 wherein:
the count number is decremented by an amount representing a phase difference between the enable signal and the periodic digitized signal if the signal value is "LOW", and
the enable signal generator advances the generation of the current switch enable signal by the amount the count number is decremented.

15. The system of claim 12 wherein the count number is remains the same if the signal value at the timing position is a signal transition from "HIGH" to "LOW" in the periodic digitized signal, and the enable signal generator regenerates the current switch enable signal.

16. The system of claim 12 wherein the first intermediate timing position is one-quarter of the period, the second intermediate timing position is one-half of the period, and the third intermediate timing position is three-fourths of the period.

17. The system of claim 1 wherein the switching subsystem comprises a gate driver, a pulse transformer, a pulse demodulator, and a current switch, the pulse transformer coupled to an output of the gate driver, the pulse demodulator coupled to an output of the pulse transformer, the current switch having an input coupled to the pulse demodulator and an output coupled to the drive coil.

18. The system of claim 17 wherein the gate driver further includes a first input, a second input, a burst frequency generator, and an amplifier, the burst frequency generator coupled to the amplifier, the first input and the second input, the amplifier coupled to the output of thee gate driver.

19. The system of claim 18 wherein a carrier frequency signal is generated by the controller on the first input of the gate driver, a current switch enable signal is generated by the controller on the second input of the gate driver, and the drive signal is generated on the output of the gate driver from the first intermediate timing position to the third intermediate timing position in each period of the periodic digitized signal, the drive signal being a burst gated frequency signal produced by the burst frequency generator and amplified by the amplifier.

20. The system of claim 19 wherein the pulse transformer generates a pulse width modulated signal, the pulse width modulated signal generated from the transformation of the burst gated frequency signal, the pulse width modulated signal having a frequency of 14 kilohertz.

21. The system of claim 20 wherein the pulse demodulator generates a drive current signal on the input of the current switch, the drive current signal generated from the pulse width modulated signal produced on the output of the pulse transformer.

22. The system of claim 20 wherein a 500 kHz frequency signal is the carrier frequency signal generated on the first input of the gate driver.

23. The system of claim 22 wherein the current switch enable signal has a voltage amplitude of 5 volts, and the drive signal on the output of the gate driver has a voltage amplitude of 18 volts.

24. The system of claim 17 wherein the current switch is an insulated-gate bipolar transistor.

25. A method for controlling a vibratory conveyor having a conveyor pan mounted thereon, the method comprising:
- sensing the vibration motion of the conveyor pan on the vibratory conveyor;
- processing a periodic vibration signal generated from the sensing of the vibration motion;
- generating at least one control signal based on the processed periodic vibration signal; and
- driving the vibratory conveyor with a drive current based on the at least one control signal from a first intermediate timing position to a third intermediate timing position.

26. The method of claim 25 wherein driving the vibratory conveyor comprises selecting an initial operating frequency and an initial operating amplitude from a non-volatile memory, processing the initial operating frequency and the initial operating amplitude in a controller, generating an initial enable signal from the initial operating frequency and the initial operating amplitude, and generating the at least one control signal from the initial enable signal and a carrier frequency signal.

27. The method of claim 26 wherein driving the vibratory conveyor comprises transforming the at least one control signal into a pulse-width-modulated signal, demodulating the pulse-width-modulated signal into a drive signal, and switching the drive current from a current switch to a drive coil, the drive signal driving the current switch switching the drive current, the drive current controlling a vibration frequency and a vibration amplitude of the vibratory conveyor.

28. The method of claim 22 wherein generating the at least one control signal comprises generating a current switch enable signal and a carrier frequency signal, generating a burst gated frequency signal from the generated current switch enable signal and the generated carrier frequency signal, and amplifying the burst gated frequency signal, the amplified burst gated frequency signal being the at least one control signal.

29. The method of claim 26 wherein sensing the vibration motion of the conveyor pan comprises detecting a vibration frequency and a vibration amplitude of the vibration motion with a motion sensor, and computing the periodic vibration signal from the vibration amplitude and the vibration frequency detected by the motion sensor.

30. The method of claim 26 wherein processing the periodic vibration signal comprises:
- converting the periodic vibration signal to a periodic digitized signal, each period of the periodic digitized signal equal to each period of the periodic vibration signal, the periodic digitized signal having an operating frequency;
- reading the periodic digitized signal at a second intermediate timing position, the first intermediate timing position being one-quarter of each period, the second intermediate timing position being one-half of each period, and the third intermediate timing position being three-fourths of each period;
- adjusting the operating frequency to a resonant frequency of the vibratory conveyor if the periodic digitized signal at the second intermediate timing position is one of a group consisting of "HIGH" and "LOW"; and
- recomputing the periodic vibration signal.

31. The method of claim 30 wherein adjusting the operating frequency comprises delaying a start time position for the generation of the at least one control signal a time period equal to a phase difference between the periodic digitized signal and the at least one control signal on which the drive current for driving the vibratory conveyor is based if the periodic digitized signal at the second intermediate timing position is "HIGH".

32. The method of claim 30 wherein adjusting the operating frequency comprises advancing a start time position for the generation of the at least one control signal a time period equal to a phase difference between the periodic digitized signal and the at least one control signal on which the drive current for driving the vibratory conveyor is based if the periodic digitized signal at the-second intermediate timing position is "LOW".

33. The method of claim 30 wherein the operating frequency equals the resonant frequency if the periodic digitized signal at the second intermediate timing position is a signal transition from "HIGH" to "LOW".

34. The method of claim 25 wherein generating the at least one control signal comprises:
- decrementing a count number to zero, the count number representing a period of the at least one control signal; and
- generating a time count for a start time position, three intermediate timing positions, and an end time position as the count number is decremented, the time count for the start time position marking the start of the period, the time count for the first intermediate timing position marking one-fourth of the period, the time count for the second intermediate timing position marking one-half of the period, the time count for the third intermediate timing position marking three-fourths of the period and the end time position marking the end of the period.

* * * * *

UNITED STATES PATENT AND TRADEMARK OFFICE
CERTIFICATE OF CORRECTION

PATENT NO. : 6,619,470 B2
APPLICATION NO. : 10/053233
DATED : September 16, 2003
INVENTOR(S) : B. Thompson It is certified that error appears in the above-identified patent and that said Letters Patent is hereby corrected as shown below:

| COLUMN | LINE | ERROR |
|---|---|---|
| ( * )<br>On the Title Page | Notice | "by 21 days." should read --by 25 days.-- |
| 1 | 9 | "amplitudes and" should read --amplitude,and-- |
| 7 | 55 | "from 16" should read --from 16-- |
| 13 | 56 | "claim 9" should read --claim 8-- |
| 14 | 22 | "claim 12" should read --claim 10-- |
| 14 | 38 | "thee" should read --the-- |
| 14 | 59 | "claim 20" should read --claim 19-- |
| 15 | 23 | "claim 26" should read --claim 25-- |
| 15 | 31 | "claim 22" should read --claim 25-- |

UNITED STATES PATENT AND TRADEMARK OFFICE
CERTIFICATE OF CORRECTION

PATENT NO. : 6,619,470 B2
APPLICATION NO. : 10/053233
DATED : September 16, 2003
INVENTOR(S) : B. Thompson It is certified that error appears in the above-identified patent and that said Letters Patent is hereby corrected as shown below:

| COLUMN | LINE | ERROR |
|---|---|---|
| 15 | 39 | "claim 26" should read --claim 25-- |
| 15 | 45 | "claim 26" should read --claim 25-- |

Signed and Sealed this

Twenty-first Day of November, 2006

JON W. DUDAS
*Director of the United States Patent and Trademark Office*